United States Patent [19]

Newton

[11] Patent Number: 4,968,217
[45] Date of Patent: Nov. 6, 1990

[54] VARIABLE PITCH ARRANGEMENT FOR A GAS TURBINE ENGINE

[75] Inventor: Arnold C. Newton, Derby, England
[73] Assignee: Rolls-Royce plc, London, England
[21] Appl. No.: 403,376
[22] Filed: Sep. 6, 1989
[51] Int. Cl.⁵ .............................................. B64C 11/32
[52] U.S. Cl. ..................................... 416/160; 416/147
[58] Field of Search ............... 416/130, 158, 160, 147, 416/157 A, 157 B, 129, 130

[56] References Cited

U.S. PATENT DOCUMENTS

| | | | |
|---|---|---|---|
| 3,422,625 | 1/1969 | Harris | 415/130 X |
| 3,647,320 | 3/1972 | Chilman et al. | 416/160 X |
| 3,687,569 | 8/1972 | Klompas | 416/160 X |
| 3,720,060 | 3/1973 | Davies et al. | 416/157 A X |
| 3,825,370 | 7/1974 | McMurtry et al. | 416/160 |
| 3,870,434 | 3/1975 | Paulson | 416/130 X |
| 3,876,334 | 4/1975 | Andrews | 416/160 |
| 3,893,783 | 7/1975 | Keenan et al. | 415/129 |
| 3,901,626 | 8/1975 | McMurtry | 416/160 |
| 4,047,842 | 9/1977 | Avena et al. | 416/152 |

FOREIGN PATENT DOCUMENTS

| | | |
|---|---|---|
| 1195963 | 6/1970 | United Kingdom . |
| 1484948 | 9/1977 | United Kingdom . |
| 1511723 | 5/1978 | United Kingdom . |
| 2016597 | 9/1979 | United Kingdom . |
| 1594232 | 7/1981 | United Kingdom . |
| 2070691 | 9/1981 | United Kingdom . |
| 2078865 | 1/1982 | United Kingdom . |
| 2173863 | 10/1986 | United Kingdom . |
| 2175652 | 12/1986 | United Kingdom . |
| 2182397 | 5/1987 | United Kingdom . |
| 2186918 | 8/1987 | United Kingdom . |
| 2187237 | 9/1987 | United Kingdom . |
| 2199378 | 7/1988 | United Kingdom . |
| 2210108 | 1/1989 | United Kingdom . |

Primary Examiner—John T. Kwon
Attorney, Agent, or Firm—Cushman, Darby & Cushman

[57] ABSTRACT

A variable pitch arrangement to enable reverse pitch settings of fan blades to be achieved without the leading and trailing edges of adjacent fan blades abutting each other comprises two sets of fan blades and two sets of actuators. The two sets of fan blades are rotatably mounted on the fan rotor, and arranged circumferentially on the fan rotor. The blades in the first set of fan blades are arranged alternately circumferentially with the blades in the second set of fan blades. There are equal numbers of blades in each set of fan blades. The two sets of actuators act independently of each other on the two sets of fan blades such that the pitch of the blades in the first set and the pitch of the blades in the second set are varied in a phased relation to prevent fouling of the blades. Initially one set of blades varies pitch quickly while the other set of blades varies pitch slowly, and then the first set of blades varies pitch slowly while the other set of blades varies pitch quickly.

12 Claims, 4 Drawing Sheets

VARIABLE PITCH ARRANGEMENT FOR A GAS TURBINE ENGINE

The present invention relates to variable pitch arrangements for gas turbine engines, in particular to variable pitch arrangements for a fan of a turbofan gas turbine engine.

Existing variable pitch arrangements rotate all the blades on a rotor at the same time and at the same speed. It is often a requirement to have a reverse pitch setting of the blades on the rotor. The use of the existing variable pitch arrangements to achieve reverse pitch settings is acceptable where the number of blades on the rotor is relatively small and the blade space to chord ratio is greater than one, as in conventional propeller rotors.

However where the numbers of blades on the rotor is relatively large it is not possible to rotate all the blades on the rotor at the same time and at the same speed to the reverse pitch setting, because the leading edge of one blade abuts against the trailing edge of the adjacent blade as the blades are rotated and hence further movement towards the reverse pitch setting is prevented. One way to reduce the possibility of the leading edge and trailing edge of adjacent blades fouling is to reduce the blade chord. This method of allowing the reverse pitch setting to be achieved has an undesirable effect in that there is a loss of blade aerodynamic performance because of the reduction in blade chord. Even this method is not sufficient to enable the reverse pitch setting to be achieved on rotors which have very large numbers of blades.

The present invention seeks to provide a variable pitch arrangement for a gas turbine engine in which the blades can be rotated to reverse pitch setting without the leading and trailing edges of adjacent blades abutting each other.

Accordingly the present invention provides a variable pitch arrangement for a gas turbine engine comprising a rotor, a plurality of first blades arranged circumferentially on and extending radially from the rotor, the plurality of first blades being rotatably mounted on the rotor to allow the pitch of the first blades to be varied, a plurality of second blades arranged circumferentially on and extending radially from the rotor, the plurality of second blades being rotatably mounted on the rotor to allow the pitch of the second blades to be varied, the plurality of first blades and the plurality of second blades being arranged to be rotatably mounted in a plane substantially perpendicular to the axis of rotation of the rotor, the plurality of first blades and the plurality of second blades being arranged alternately circumferentially, the number of second blades being equal to the number of first blades, a first actuator means being arranged to vary the pitch of the plurality of first blades, a second actuator means being arranged to vary the pitch of the plurality of second blades, the first actuator means and the second actuator means varying the pitch of the first blades and the second blades in a phased relation to each other so that the leading edge of the first blades are prevented from fouling with the trailing edge of the second blades.

The first blades may have root portions, the root portions having gear teeth on at least a portion of their circumference, the first actuator comprises a first annular member, the first annular member has gear teeth on its circumference, the gear teeth on the first annular member mesh with the gear teeth on the root portions of the first blades.

The second blades may have root portions, the root portions have gear teeth on at least a portion of their circumference, the second actuator comprises a second annular member, the second annular member has gear teeth on its circumference, the gear teeth on the second annular member mesh with the gear teeth on the portions of the second blades.

The first annular member may be a ring gear, the ring gear has teeth on all of its circumference.

The second annular member may be a ring gear, the ring gear has teeth on all of its circumference.

The first annular member may have a plurality of first sectors and a plurality of second sectors, the first sectors and second sectors being arranged alternately circumferentially, the first sectors having gear teeth which mesh with the gear teeth on the root portions of the first blades.

The second annular member may have a plurality of first sectors and a plurality of second sectors, the first sectors and second sectors being arranged alternately circumferentially, the first sectors having gear teeth which mesh with the gear teeth on the root portions of the second blades.

The first actuator may comprise a first hydraulic motor and a first drive shaft to drive the first ring gear.

The second actuator may comprise a second hydraulic motor and a second drive shaft to drive the second ring gear.

The first ring gear may be positioned axially downstream of the blades, the second ring gear is positioned axially upstream of the blades, the root portions of the first blades not having gear teeth over a portion of their circumferences, the portions of the root portions of the first blades not having gear teeth being arranged to abut and to react loads into the second drive shaft, the root portions of the second blades not having gear teeth over a portion of their circumferences, the portions of the root portions of the second blades not having gear teeth being arranged to abut and to react loads into the first drive shaft.

The first annular member may be positioned axially downstream of the blades, the second annular member is positioned axially upstream of the blades, the root portions of the first blades not having gear teeth over a portion of their circumferences, the portions of the root portions of the first blades not having gear teeth being arranged to abut and to react loads into the second sectors of the second annular member, the second sectors of the second annular member not having gear teeth, the root portions of the second blades not having gear teeth over a portion of their circumferences, the portions of the root portions of the second blades not having gear teeth being arranged to abut and to react loads into the second sectors of the first annular member, the second sectors of the first annular member not having gear teeth.

The rotor is a fan rotor, the first and second blades are fan blades.

The present invention will be more fully described by way of example, with reference to the accompanying drawings in which.

Figure 1:
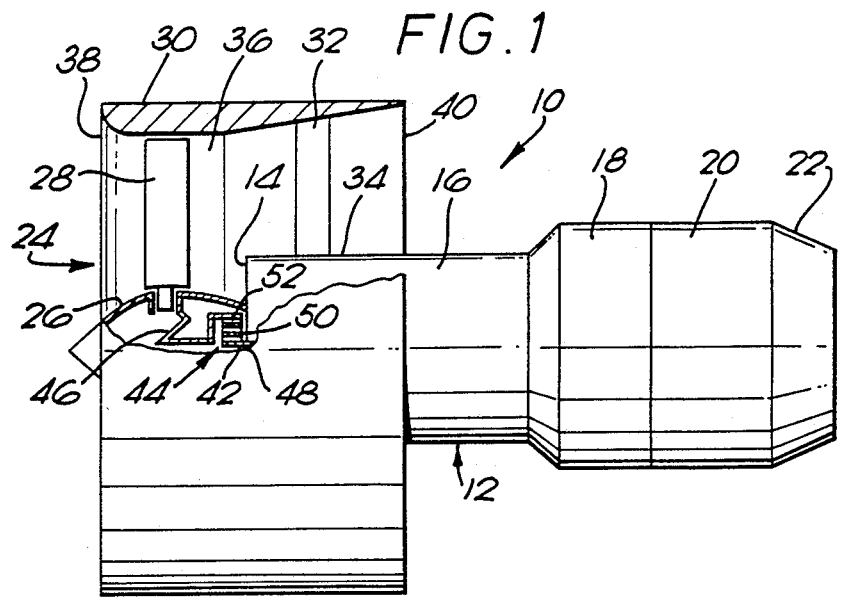
FIG. 1 is a partially cut away view of a turbofan gas turbine having a variable pitch arrangement for a fan according to the present invention.

A turbofan gas turbine engine 10 is shown in FIG. 1, and the turbofan 10 comprises a core engine 12 and a fan section 24. The core engine 12 comprises in axial flow series an inlet 14, a compressor section 16, a combustor section 18, a turbine section 20 and an exhaust nozzle 22. The compressor section 16 may comprise a high pressure compressor only or a low pressure compressor and a high pressure compressor in flow series. Similarly the turbine section 20 may comprise a high pressure turbine to drive the high pressure compressor, or a high pressure turbine and a low pressure turbine in flow series to drive the high pressure compressor and low pressure compressor. The turbine section 20 is also arranged to drive the fan section 24 and one of the high pressure or low pressure turbines or a separate power turbine is provided for this purpose.

The core engine 12 operates quite conventionally in that air flowing into the inlet 14 is compressed by the compressor section 16 before being supplied into the combustion section 18. Fuel is injected into the combustion section 18, and is burnt in the air to produce hot gases which flow through and drive the turbines in the turbine section 20 before passing through the exhaust nozzle 22 to atmosphere.

The fan section 24 comprises a fan rotor 26 which has a plurality of fan blades 28 arranged circumferentially on and extending radially outwardly from the fan rotor 26. The fan blades 28 are rotatably mounted on the fan rotor 26 to allow the pitch of the fan blades 28 to be varied. The fan rotor 26 and fan blades 28 are enclosed by a coaxial fan casing 30 which is secured to the core engine 12 casing 34 by a plurality of stator vanes 32. The fan casing 30 defines the outer flow surface of a fan duct 36 which has an inlet 38 and an outlet 40.

The fan rotor 26 and fan blades 28 are positioned axially upstream of the core engine 12, and a portion of the air compressed by the fan rotor 26 and fan blades 28 flows through the inlet 14 into the core engine 12, and the remainder of the air flows through the fan duct 36 to the outlet 40.

Figure 2:
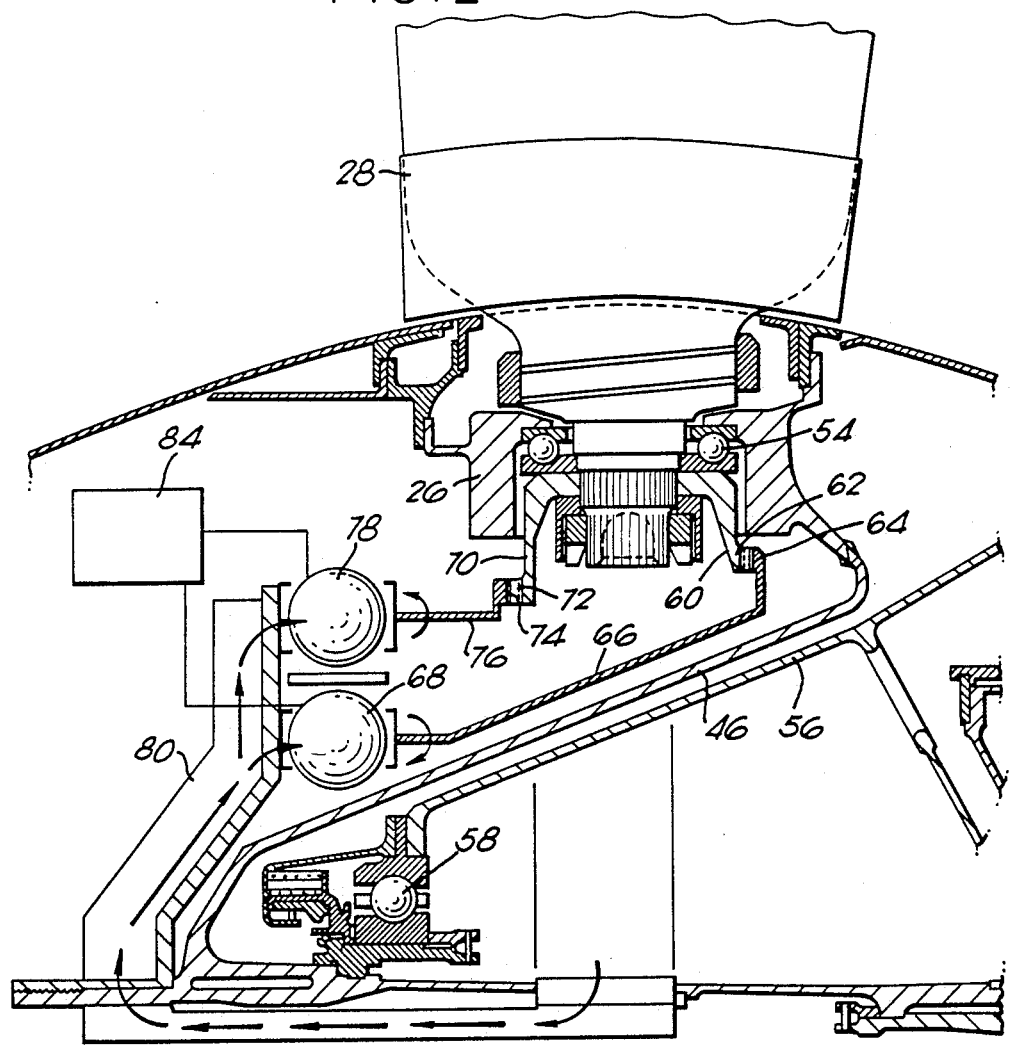
FIG. 2 is an enlarged longitudinal cross-sectional view of the fan and variable pitch arrangement shown in FIG. 1.
Figure 4:
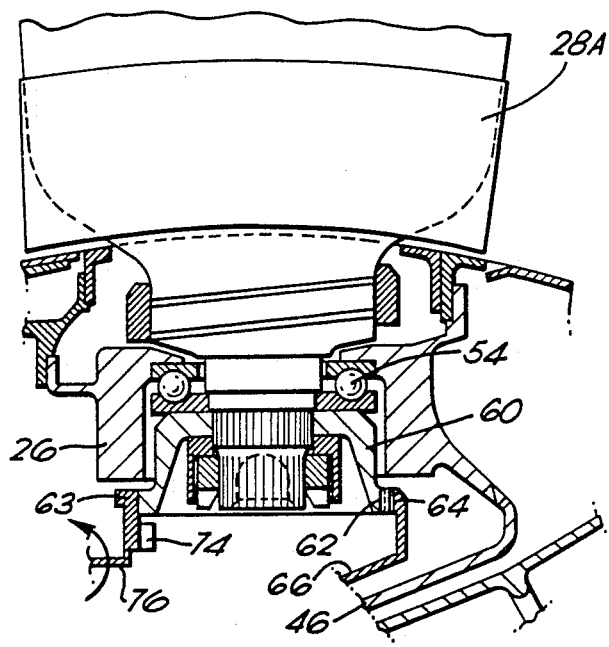
FIG. 4 is a longitudinal cross-sectional view of the fan and one variable pitch mechanism.
Figure 5:
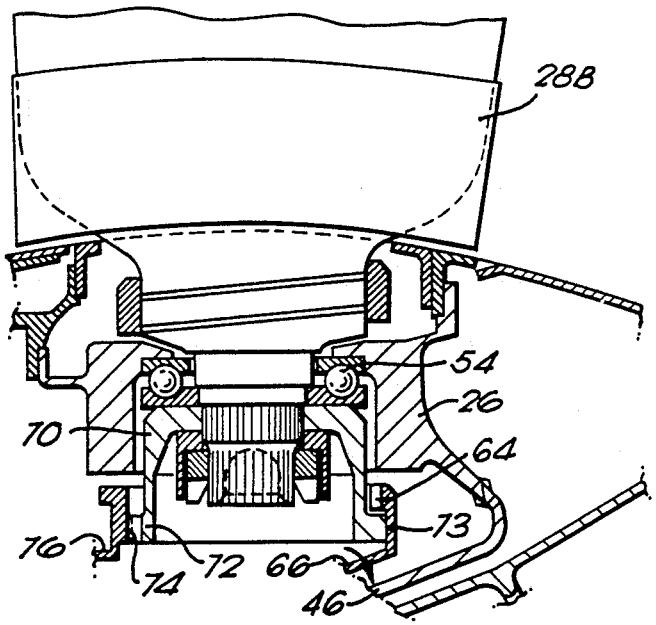
FIG. 5 is a longitudinal cross-sectional view of the fan and a second variable pitch mechanism.

The fan rotor 26 is driven by the turbine section 20 via a shaft 42 which extends coaxially through the core engine 12, a gear assembly 44 and a shaft 46. The gear assembly 44 comprises a sun gear 48, a plurality of star gears 50 and an annulus gear 52. The sun gear 48 is driven by the shaft 42, and the sun gear 48 meshes with and drives the star gears 50. The star gears 50 are rotatably mounted in a carrier (not shown) which is secured to the core engine casing 34. The star gears 50 mesh with and drive the annulus gear 52. The annulus gear 52 drives the shaft 46 which is connected to the fan rotor 26. The fan blades 28 are rotatably mounted on the fan rotor 26 by bearings 54. The shaft 46 is rotatably mounted on static structure 56 secured to the core casing 34 by a bearing 58, as seen more clearly in FIG. 2.

Figure 3:
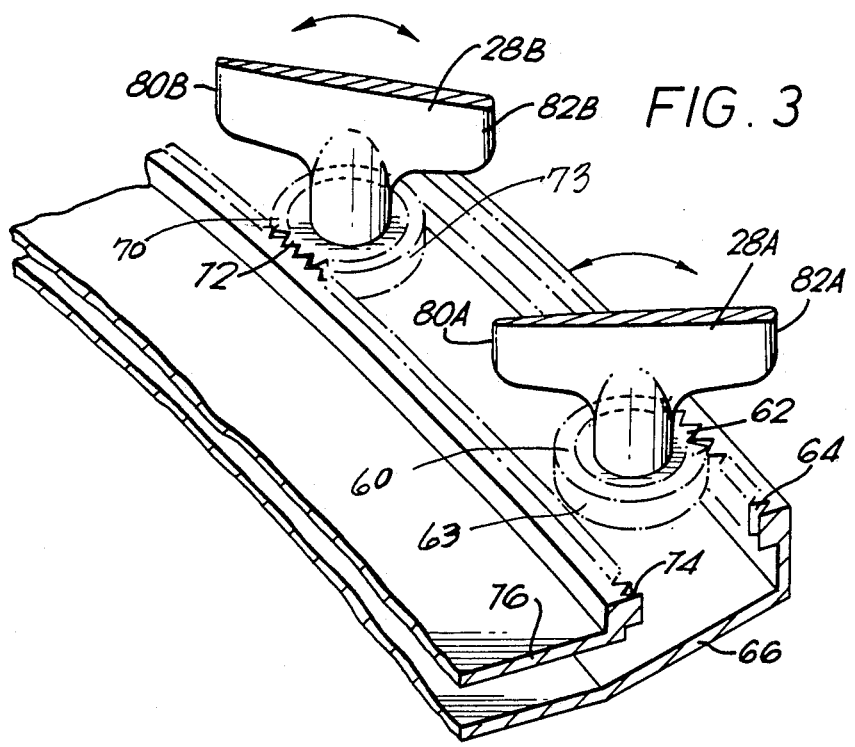
FIG. 3 is a perspective view of part of the fan and variable pitch arrangement shown in FIG. 2.

The fan rotor 26, fan blades 28 and variable pitch arrangement are seen more clearly in FIGS. 2 to 5. The fan blades 28 are arranged into a first set which has a plurality of first fan blades 28A and a second set which has a plurality of second fan blades 28B. The plurality of first fan blades 28A and the plurality of second fan blades 28B are arranged alternately circumferentially around the fan rotor 26, as seen in FIG. 3, and there is an equal number of first fan blades 28A and second fan blades 28B.

Each first fan blade 28A has a root portion 60 which is provided with gear teeth 62 on its outer surface. These teeth 62 are arranged over a portion of the circumference of the root portion 60 and the remainder 63 of the outer surface of the root portion 60 is smooth. Since each first fan blade 28A will move by less than 180° rotation, only half the circumference of the root portion 60 has gear teeth 62. Similarly each second fan blade 28B has a root portion 70 which is provided with gear teeth 72 on its outer surface. These teeth 72 are also arranged over a portion of the circumference of the root portion 70 and the remainder 73 of the outer surface of the root portion 70 is smooth. Again since each second fan blade 28B will move by less than 180° rotation, only half the circumference of the root portion 70 has gear teeth 72.

A first actuation arrangement to change the pitch of the first fan blades 28A comprises a first ring gear 64 which meshes with the gear teeth 62 on the outer surface of the root portion 60 of each first fan blade 28A. The first ring gear 64 is arranged to be driven by a first drive shaft 66 which in turn is driven by a hydraulic motor 68. A second actuation arrangement to change the pitch of the second fan blades 28B comprises a second ring gear 74 which meshes with the gear teeth 72 on the outer surface of the root portion 70 of each second fan blade 28B. The second ring gear 74 is arranged to be driven by a second drive shaft 76 which in turn is driven by a hydraulic motor 78.

The hydraulic motors 68 and 78 are supplied with high pressure oil via an oil feed pipe 80.

The first ring gear 64 is positioned axially downstream of the root portions of the fan blades 28 and the second ring gear 74 is positioned axially upstream of the root portions of the fan blades 28. The smooth portion 63 of the root portion 60 of each first fan blade 28A is arranged to abut the second drive shaft 76 and the smooth portion 73 of the root portion 70 of each second fan blade 28B is arranged to abut the first drive shaft 66.

A controller 84, i.e. a full authority digital electronic control FADEC, is used to control the operation of the hydraulic motors 68 and 78.

In operation when the pitch of the fan blades 28 is fixed no oil is supplied to the hydraulic motors 68 and 78 and therefore the drive shafts 66 and 76 do not transmit drive to the ring gears 64 and 74. When the pitch of the fan blades 28 is to be changed oil is supplied to the hydraulic motors 68 and 78. If reverse pitch setting is not selected the hydraulic motors 68 and 78 drive the shafts 66 and 76 in opposite directions at the same angular speed so that the ring gears 64 and 74 adjust the pitch of the first fan blades 28A and the second fan blades 28B by the same angle.

If reverse pitch setting is selected the hydraulic motors 68 and 78 drive the shafts 66 and 76 independently in opposite directions at different angular speeds. The hydraulic motor 68 is arranged to drive the shaft 66 initially relatively quickly, while the hydraulic motor 78 is arranged to drive the shaft 76 initially relatively slowly. The quick movement of the first drive shaft 66 and hence first ring gear 64 causes the first fan blades 28A to move through a larger angle than the second fan blades 28B have been caused to move by the slow movement of the second drive shaft 76 and second ring gear 74. The movement of the first fan blades 28A through a large angle in the same time as the movement of the second fan blades 28B through a small angle allows the leading edge 80A of the first fan blades 28A to pass the trailing edge 82B of the second fan blades 28B. Once the leading edge 80A of the first fan blades 28A has passed the trailing edge 82B of the second fan blades 28B the hydraulic motor 68 is arranged to drive the shaft 66 relatively slowly, while the hydraulic motor 78 is arranged to drive the shaft 76 relatively quickly so that all the fan blades 28 arrive at the reverse pitch setting at the same time. A similar procedure would occur in changing back from the reverse pitch setting.

The smooth portions 63 and 73 are provided on the root portions 60 and 70 of the fan blades 28A and 28B respectively so that gear separation loads may be reacted by using the drive shafts 66 and 76 as stabilizing devices.

During pitch change procedure the rotational speed of the fan rotor 26 and core engine 12 is reduced in order to reduce the loads acting on the pitch change mechanisms, and to maintain the airflow around the fan blades in a more stable condition whilst the pitch is changing.

The space to chord ratio is established by the level of control on the differential speed of rotation between the two pitch change actuating systems.

Thus the use of the two sets of blades, driven by two independent drive shaft and gears at different angular speeds enables reverse pitch to be achieved without the need to cut back the blades at the root to enable the leading and trailing edges of adjacent blades to pass each other.

Although two hydraulic motors have been shown to drive the two independent drive shafts and gears at different angular speeds it may be possible to use a single hydraulic motor with two outputs to drive them. Similarly other types of motor may be used to drive the two independent drive shafts and gears.

Figure 6:
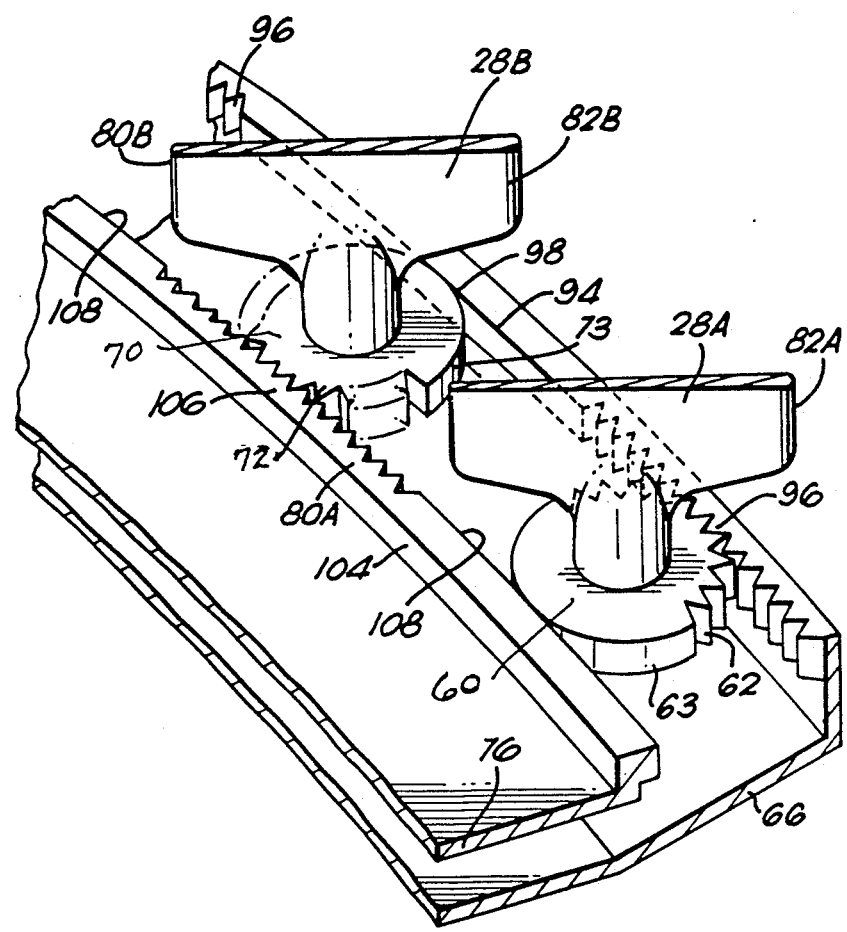
FIG. 6 is a perspective view of an alternative arrangement.

An alternative arrangement is shown in FIG. 6, in this arrangement a first annular member 94 is provided to change the pitch of the first fan blades 28A and a second annular member 104 is provided to change the pitch of the second fan blades 28B. The first annular member 94 differs from the first ring gear 64 in that whereas the first ring gear 64 has teeth throughout its full circumference, the first annular member 94 has a plurality of first sectors 96 and a plurality of second sectors 98 arranged throughout its circumference. The first sectors 96 and second sectors 98 of the first annular member 94 are arranged alternately circumferentially. The first sectors 96 have gear teeth which are arranged to mesh with the gear teeth 62 on the outer surface of the root portion 60 of the first fan blades 28A. The second sectors 98 are smooth and abut the smooth portions 73 of the root portion 70 of the second fan blades 28B Similarly first sectors 106 and second sectors 108 of the second annular member 104 are arranged alternately circumferentially. The first sectors 106 have gear teeth which are arranged to mesh with the gear teeth 73 on the outer surface of the root portion 70 of the second fan blades 28B. The second sectors 108 are smooth and abut the smooth portions 63 of the root portion 60 of the first fan blades 28A.

This arrangement operates in substantially the same manner as that as the embodiment in FIGS. 2 to 5.

I claim:

1. A variable pitch arrangement for a gas turbine engine comprising:

a rotor having an axis of rotation;

a plurality of first blades being arranged circumferentially on and extending radially from the rotor, the plurality of first blades being rotatably mounted on the rotor to allow the pitch of the first blades to be varied, wherein each first blade has a circular root portion having gear teeth on at least a portion of its circumference, a leading edge and a trailing edge;

a plurality of second blades being arranged circumferentially on and extending radially from the rotor, the plurality of second blades being rotatably mounted on the rotor to allow the pitch of the second blade's to be varied, wherein each second blade has a circular root portion having gear teeth on at least a portion of its circumference, a leading edge and a trailing edge;

wherein the plurality of first blades and the plurality of second blades are arranged to e rotatably mounted in a plane substantially perpendicular to ht axis of rotation of the rotor, and arranged alternately circumferentially, the number of second blades being equal to the number of first blades first actuator means being arranged to vary the pitch of the plurality of first blades only, the first actuator comprising a first annular member having gear teeth on its circumference which mesh only with the gear teeth on the root portions of the first blades;

second actuator means being arranged to vary the pitch of the plurality of second blades only, the second actuator comprising a second annular member having gear teeth on its circumference which mesh only with the gear teeth on the root portions of the second blades;

wherein the first actuator means and the second actuator means vary the pitch of the first blades and the second blades independently of each other so that ht leading edges of the first blades are prevented from contacting the trailing edges of the second blades.

2. A variable pitch arrangement as claimed in claim 1, wherein the first actuator comprises a first drive shaft to drive the first annular member.

3. A variable pitch arrangement as claimed in claim 2, wherein the second actuator comprises a second drive shaft to drive the second annular member.

4. A variable pitch arrangement as claimed in claim 3, further comprising motor means for driving the first drive shaft and the second drive shaft independently and in opposite directions.

5. A variable pitch arrangement as claimed in claim 4, wherein the motor means comprises a first hydraulic motor for driving the first drive shaft in a first direction and a second hydraulic motor for driving the second drive shaft independently of, and in an opposite direction from, the first drive shaft.

6. A variable pitch arrangement as claimed in claim 1, wherein the first annular member is a ring gear having teeth on all of its circumference.

7. A variable pitch arrangement as claimed in claim 6, wherein the second annular member is a ring gear having teeth on all of its circumference.

8. A variable pitch arrangement as claimed in claim 7, wherein the first ring gear is positioned axially downstream of the first and second blades, the second ring gear is positioned axially upstream of the first and second blades, the root portions of the first blades not having gear teeth over a portion of their circumferences, the portions of the root portions of the first blades not having gear teeth being arranged to abut and to react loads into the second drive shaft, the root portions of the second blades not having gear teeth over a portion of their circumferences, the portions of the root portions of the second blades not having gear teeth being arranged to abut and to react loads into the first drive shaft.

9. A variable pitch arrangement as claimed in claim 1, wherein the first annular member has a plurality of first sectors and a plurality of second sectors, the first sectors and second sectors being arranged alternately circumferentially, the first sectors having gear teeth which mesh with the gear teeth on the root portions of the first blades and the second sectors being smooth.

10. A variable pitch arrangement as claimed in claim 9, wherein the second annular member has a plurality of first sectors and a plurality of second sectors, the first sectors and second sectors being arranged alternately circumferentially, the first sectors having gear teeth which mesh with the gear teeth on the root portions of the second blades and the second sectors being smooth.

11. A variable pitch arrangement as claimed in claim 10, wherein eh first and second annular member are positioned respectively axially downstream and upstream of the first and second blades, wherein the circumferences of the root portions of the first blades have smooth portions which are arranged to abut the second sectors of the second annular member, and the circumferences of the root portions of the second blades have smooth portions which are arranged to abut the second sectors of the first annular member.

12. A variable pitch arrangement as claimed in claim 1, wherein the rotor is a fan rotor, and the first and second blades are fan blades.

* * * * *